United States Patent [19]

Muenchinger

[11] 4,194,430

[45] Mar. 25, 1980

[54] THREAD-FORMING SCREW WITH STEP TAPER

[75] Inventor: Herman G. Muenchinger, South Dartmouth, Mass.

[73] Assignee: Research Engineering & Manufacturing, Inc., New Bedford, Mass.

[21] Appl. No.: 902,098

[22] Filed: May 5, 1978

[51] Int. Cl.² ............................................. F16B 25/00
[52] U.S. Cl. ........................................... 85/46; 85/41
[58] Field of Search .................... 85/48, 46, 41, 47; 10/152 T

[56] References Cited

U.S. PATENT DOCUMENTS

| | | | |
|---|---|---|---|
| 1,809,758 | 6/1931 | Rosenberg | 85/41 |
| 3,050,755 | 8/1962 | Welles | 10/152 T |
| 3,246,556 | 4/1966 | Phipard | 85/46 |
| 3,269,006 | 8/1966 | Welles | 10/152 T X |
| 3,364,807 | 1/1968 | Holton | 85/46 X |
| 3,726,180 | 4/1973 | Rosan | 85/46 |
| 3,752,030 | 8/1973 | Steurer | 85/46 |
| 3,918,345 | 11/1975 | Phipard | 85/46 |
| 4,040,328 | 8/1977 | Muenchinger | 85/46 |

Primary Examiner—Rodney H. Bonck
Attorney, Agent, or Firm—Trexler, Wolters, Bushnell & Fosse, Ltd.

[57] ABSTRACT

A thread-forming screw has a point or lead thread portion having a relatively steep entry angle with respect to the screw axis. Adjacent to the point thread is a tapered thread portion of about two to three pitches in axial length. This tapered thread has a shallow entry angle defined by the taper of the maximum diameter of the thread toward the point. This shallow entry angle may be approximately 5° to 8° or equal to about three times the helix angle of the tapered thread. This configuration of the tapered thread results in a balanced action of thread formation and axial in-feed of the screw, resulting in a lower end pressure to initiate the thread-forming in a workpiece. A roll-threading die is contoured to provide ridges and valleys to effect the tapered thread portion.

10 Claims, 6 Drawing Figures

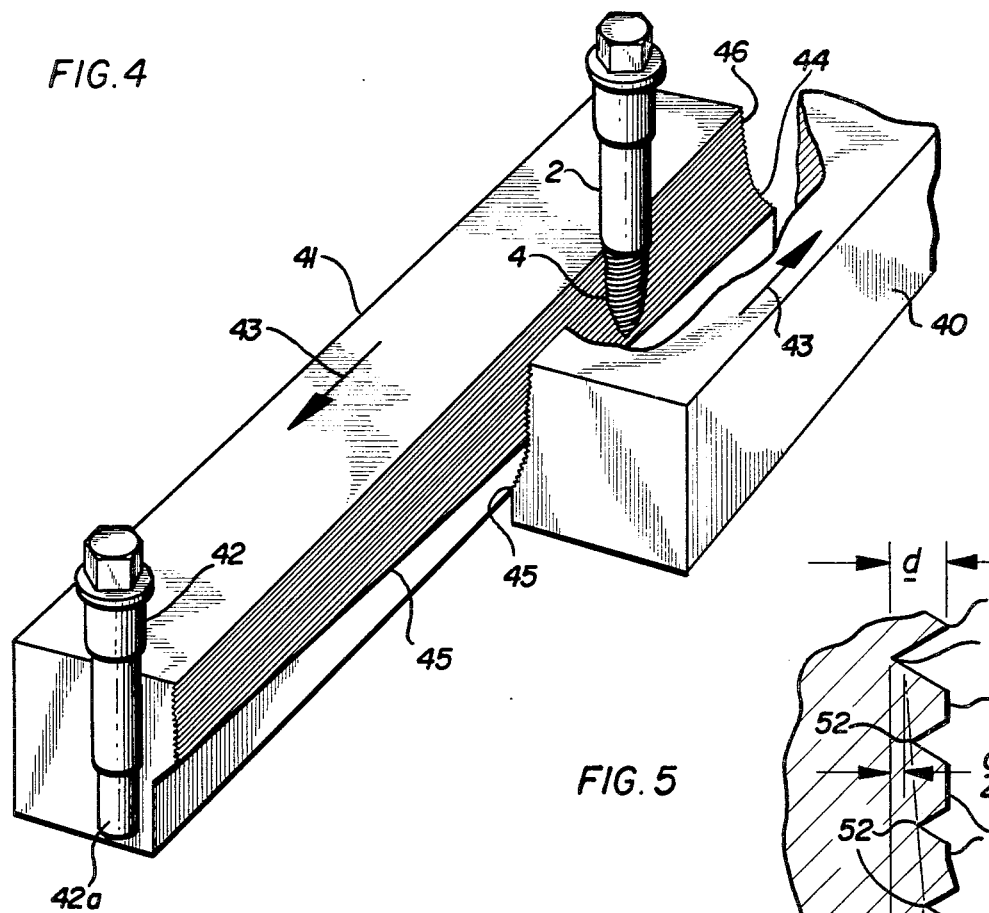
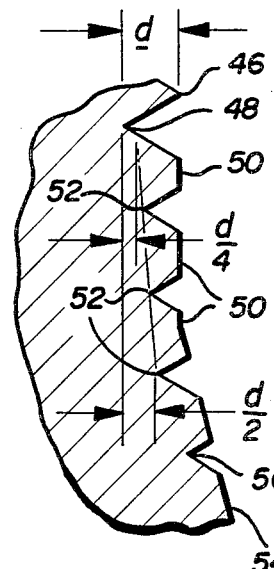
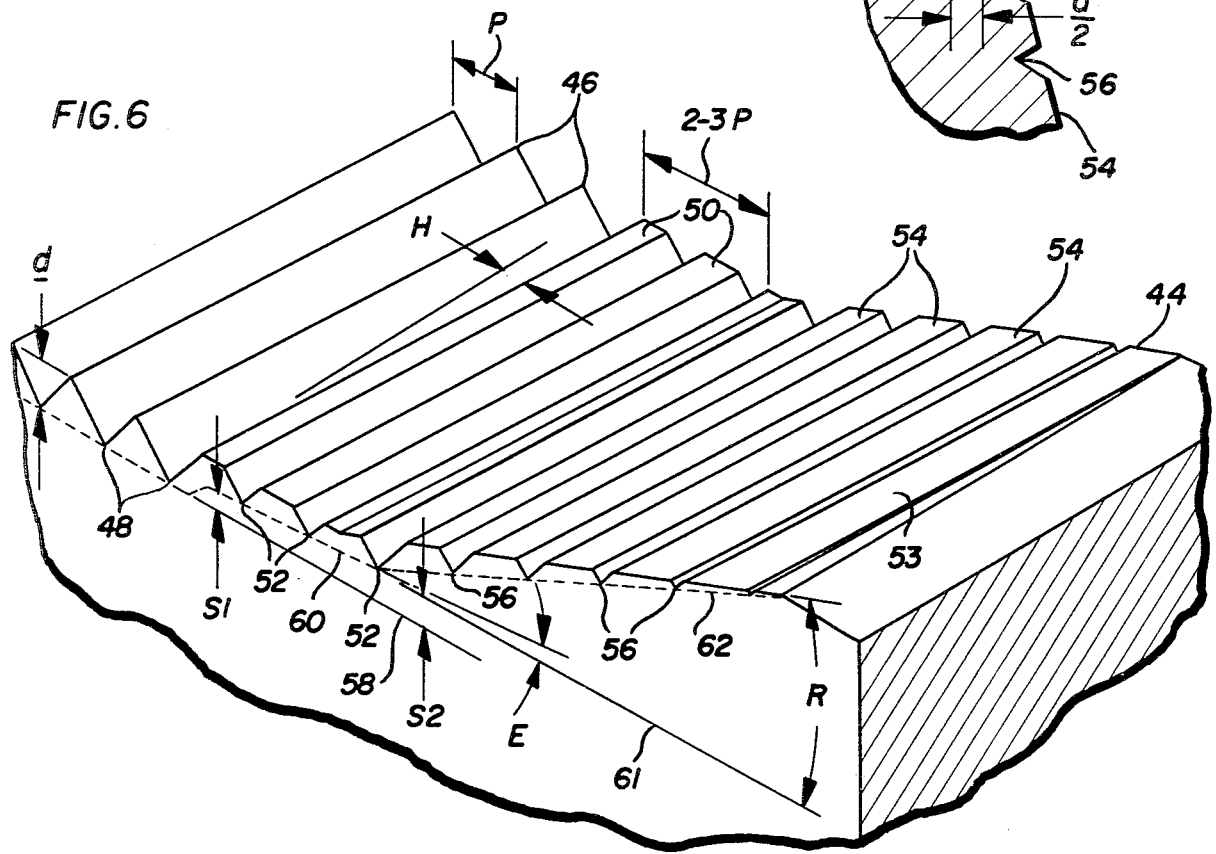

THREAD-FORMING SCREW WITH STEP TAPER

BACKGROUND OF THE INVENTION

This invention relates to improvement in thread-forming screws, more particularly to a screw in which the end pressure required for initiating thread-forming action in a workpiece is materially reduced without the necessity of forming the screw of an impractical length.

It is known that in a thread-forming screw the use of a steep entry or point angle tends to resist the pickup or starting of the thread-forming action of the screw in the workpiece hole. Therefore, in order to effect thread-forming action it is necessary to apply substantial end pressure to the screw, viz, enough end pressure is required to overcome the resistance of the thread to entry into the workpiece hole.

Recently the gimlet point thread-forming screw has come into use as a machine screw thread for various utilizations in metal wherein the point of screw serves to locate the workpiece hole. In these kinds of screws, however, the starting end pressures are necessarily somewhat high. It is, of course, possible to reduce the entry angle by providing a full length taper which is very gradual. However, a full length taper point of this type would consume too many threads and would thus make the screw length excessive and impractical.

OBJECTS AND SUMMARY OF THE INVENTION

An object of this invention is to provide a thread-forming screw which incorporates a tapered portion having a small or shallow entry angle extending over a few turns of the thread so that resistance to starting is decreased and correspondingly the required end pressure to effect thread-starting is reduced.

The thread-forming screw of this invention comprises a shank that has a portion thereof constituting an entrance end at which the screw is inserted into a hole in a workpiece, said portion having a tip and a helical thread, the crest of the thread tapering towards said tip, said thread having a contour defining means for swaging a thread in a workpiece. The thread taper has a first section with a first taper and a second section with a second taper, the first section being intermediate the tip and the second section, the taper on the second section being less than the taper on the first section, and the second section being substantially where the thread-swaging action commences when the entrance end of the screw is inserted into the workpiece hole.

More particularly, the aforesaid second section may be considered as a so-called "step taper" between the initial turns of the thread at the tip and holding section of the screw. This step taper extends over an axial length of about two to three times the thread pitch. The step taper provides a line of taper of the major diameter of the thread. This taper forms with a line parallel to the screw axis an entry angle at which threading of the workpiece hole is initiated. The step taper thread also has a helix angle which determines the in-feed or axial movement of the screw during the threading operation. It has been found that when the entry angle is equal to or less than about three times the helix angle at the region of thread engagement with the workpiece, a balanced action occurs between radial displacement of the material in the workpiece hole and the axial feed created by the thread helix.

Viewed another way, the step of the step taper from the holding section of the screw is approximately 25% of the thread depth or 16% of the thread pitch. At the end of the two to three pitch taper the thread depth has decreased to about 50% of the thread depth or 32% of the pitch. Typically, this works out to a step taper entry angle of about 5° to 8°.

The invention also contemplates roll-threading dies for producing a screw thread on a screw blank and which screw thread embodies the step taper referred to previously. This die comprises a first series of ridges and first valleys with the uniform depth, a second series of ridges with second valleys of varying depth, which depth is less than the depth of the valleys of the first series, a first plane formed by the bases of the first valleys and intersecting a second plane formed by the bases of the second valleys to define the first angle, a third series of ridges with at least one valley, the base of said last-mentioned valley and the base of the nearest of the valleys of the second series defining a third plane that forms a second angle with the first plane, said second angle being substantially larger than the first angle. The first angle is about 5° to 8° and provides the die configuration for forming the step taper. The number of ridges and valleys are such as to form a two to three pitch taper. The dies are constructed with about 20° to 30° angular ramp on the faces thereof which are designed to forge the point contour. Where gimlet point screws are to be made, the exposed edge of the ramp cuts away the excessive material in accordance with known techniques.

BRIEF DESCRIPTION OF THE FIGURES

FIG. 4 is a fragmentary perspective view showing the roll dies used to roll screw blanks to produce screws of this invention;

FIG. 5 is a fragmentary sectional view of a portion of FIG. 4; and

FIG. 6 is a perspective view of a portion of the die.

DETAILED DESCRIPTION

Figure 1:
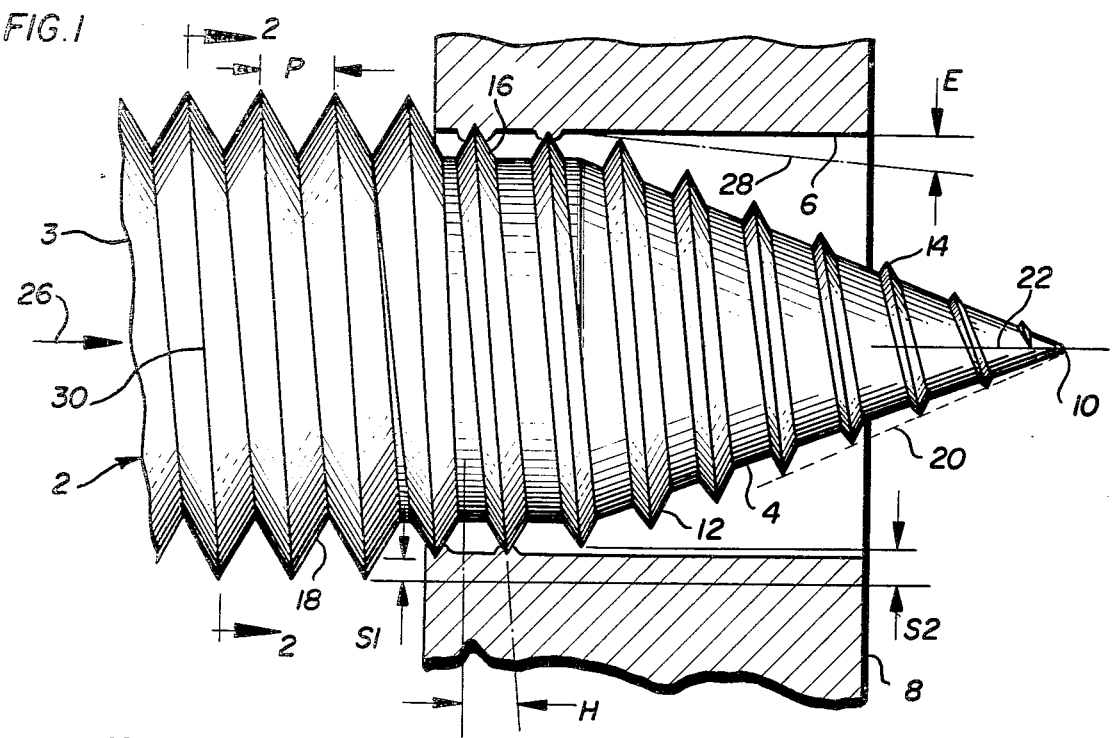
FIG. 1 is a fragmentary side elevational view of a screw construction in accordance with and embodying the present invention.
Figure 2:
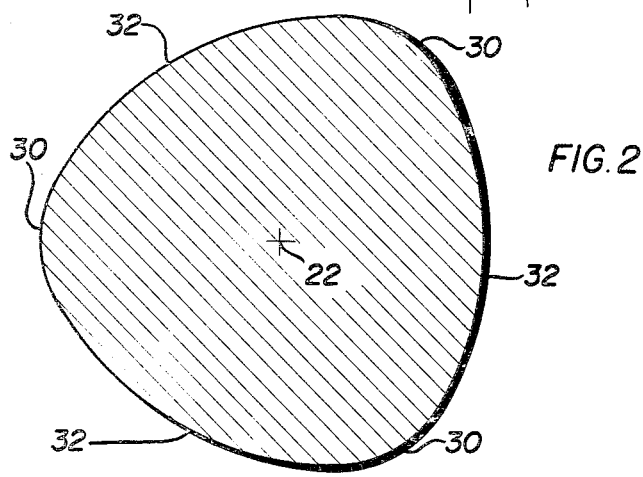
FIG. 2 is a sectional view taken along line 2—2 of FIG. 1.

Reference may now be had to the drawing, and in particular, FIGS. 1 and 2, wherein there is shown a thread-forming screw 2 having a shank 3 with a portion 4 thereof constituting an entrance end of the screw at which the screw is inserted into a hole 6 in a workpiece 8. The portion 4 has a tip 10 and a helical thread 12, the crest of the thread 12 tapering toward the tip 10. The helical thread portion 12 has a first section 14, a second section 16 of about two to three times the thread pitch in axial length and a third section 18. The first section 14 is intermediate the tip 10 and the second section 16 while the second section 16 is intermediate the first section 12 and the third section 18.

The first section 14 has a crest taper toward the tip 10 as represented by the dotted line 20. The line 20 intersects the longitudinal axis 22 of the screw 2 to form an angle of about 20° to 30°. Such a condition is typical in a gimlet point screw. If the relatively steep taper of about 20° to 30° were extended through both the first section 14 and the second section 16, there would be a condition in which a relatively high end pressure in the direction of the arrow 26 would be required in order to commence swaging of the workpiece hole 6.

To avoid the foregoing difficulty, however, the taper in the second section 16 is made considerably less than the taper in the first section 14. The effect of this reduced taper is to provide ease of starting the thread in the workpiece 8 for the reason that it is in the second section 16 that the thread-swaging action is initiated after the screw is inserted into the workpiece hole 6. The taper of the crest of the thread in the second section 16 is such as to form an entrance angle E of about 5° to 8°. The 5° to 8° entrance angle E is illustrated in FIG. 1 with reference to the cross-section line of cut through the workpiece hole; however, the line of taper 28 of the second section 16 thread will intersect the axis 22 to form the angle E.

In the present invention, it is desirable to have a balanced action between the radial displacement of workpiece material during threading and the axial feed of the screw into the workpiece. This axial feed is controlled by the helix angle H. This helix angle H is generally constant in the third section 18 but may increase for the successive turns of the thread from the second section 16 forwardly through the first section 14 to the tip 10. In any event, the present invention is concerned with the helix angle H at the point of engagement of the thread with the workpiece hole 6 and its relationship to the angle of entry E, namely, the taper of the major or crest diameter of the starting thread in the section 16. It has been found that this entrance angle E should be not more than approximately three times the helix angle H of the thread at the second section 16.

The third section 18 is the section at which the thread forming is completed and also where the screw is maintained in holding relationship with the thread formed in the workpiece hole 6. However, a step taper is in effect provided between the third section 18 and the second section 16 as represented by the radial dimension or the step S1. This step S1 is preferably approximately 0.25 times the crest-to-root thread depth in the adjacent part of the third section. Since the second section 16 has an axial entent of about two to three times the thread pitch, the final step S2 of the step taper is about 0.50 times the crest-to-root thread depth in the third section 18. The foregoing relationships constituting the step taper result in a thread starting action with relatively low end pressure.

The screw 2 also has a suitable thread contour for swaging the thread in the workpiece hole. By way of example, the thread 12 in each of the first, second and third sections may have a known lobular cross-section as shown in FIG. 2. This cross-section is intended to represent not only the crest cross-section of the thread but also the root and pitch cross-sections. This cross-section is defined by lobes 30, 30, 30 which affect the thread-swaging action. Intermediate the lobes 30, 30, 30 and merging therewith are arcuate sides 32, 32, 32 having longr radii of curvature than the radii of curvature of the respective lobes 30, 30, 30. The respective arcuate sides and lobes are all symetrically arranged about the center or axis 22. The width of the cross-section shown in FIG. 2 taken through the axis 22 is uniform throughout 360°. It should be noted, however, that the cross-section shown in FIG. 2 need only be applicable to the thread-swaging portions of the screw 2. The thread portion of the screw 2 that holds a piecepart assembled with the workpiece need not be of the lobular cross-section shown in FIG. 2 but may in fact be a circular cross-section or a cross-section with only a slight amount of lobulation to enhance its thread gripping action. Moreover, the invention is not limited to the particular kind of thread-swaging configuration shown in FIG. 2 as the screw may have other forms of lobulation or other configurations in the thread-swaging regions of the second section 16 and/or the third section 18.

Figure 3:
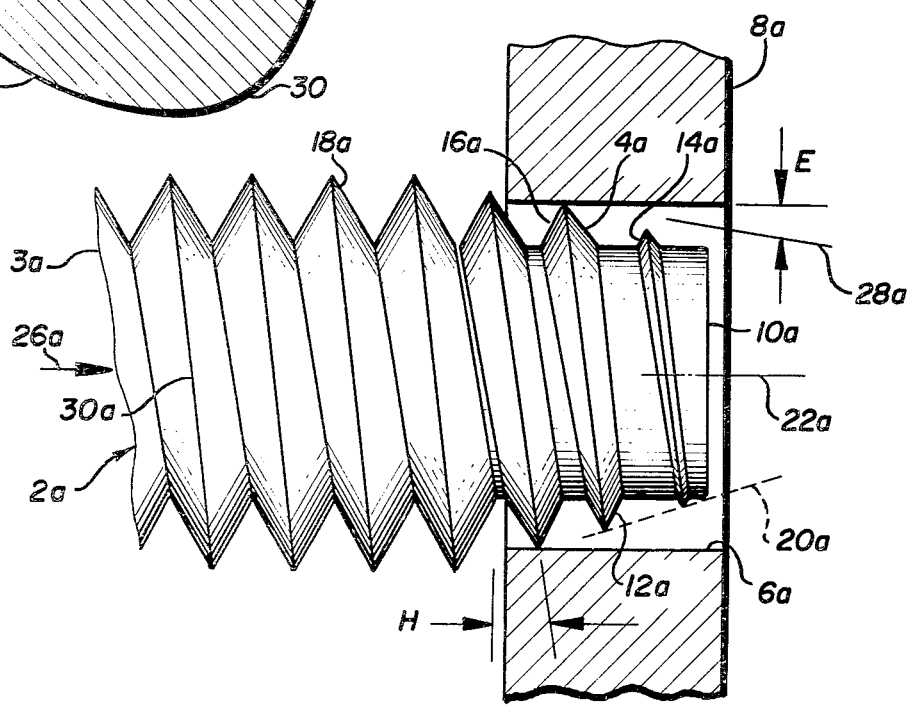
FIG. 3 is a fragmentary side elevational view of another embodiment of the invention.

The invention is also applicable to a blunt ended screw 2a of the type shown in FIG. 3 in which like parts, as compared to FIGS. 1 and 2, are similarly designated in FIG. 3 with a suffix "a." Thus, the screw 2a, which may be lobular in cross-section, has a shank 3a with the three portions 14a, 16a, 18a, and wherein the portion 16a constitutes the step taper region at which the threading of the hole 6a in the workpiece 8a is initiated. In the embodiment shown in FIG. 3, the angle formed by crest taper line 20a and axis 22a may be about 12°. However, the approximate 5°-7° entrance angle E insures screw entry into a minimum diameter (pitch diameter) pilot hole 6a. The exact entrance angle may, of course, vary within the approximate range of three times the helix angle depending upon the length of the entry taper as well as the magnitude of the initial step S1 and the increment of thread depth desired.

FIGS. 4, 5 and 6 illustrate cooperating dies 40, 41 for manufacturing the gimlet point screw shown in FIG. 1. The dies 40, 41 are movable in opposite directions relatively as shown by the arrows 43—43 whereby to form a thread on the screw blank 42. In the gimlet point screw illustrated, the thread is formed on the end section 42a of the blank as the blank moves between the dies. In accordance with conventional practice, the dies are formed with ramps relieved to expose knife edges as at 45 so that during the roll forging of the threads, the point or tip 10 is formed and excess material is cut off.

The die 41 is shown in more detail in FIGS. 5 and 6, wherein FIG. 5 shows an enlarged cross-section of the die 41 at its trailing end 44 while FIG. 6 shows a perspective at the trailing end 44. Die 40 is of a configuration similar to die 41.

The die 41 has a first series of ridges 46 with first valleys 48 therebetween, the first valleys being of substantially uniform depth. This depth d is approximately 0.65P wherein P represents the thread pitch. The first series of ridges and valleys 46, 48 forge the section 18 of the screw in FIG. 1.

The die 41 also has a second series of ridges 50 with the intervening valleys 52. The helix angle is indicated at H. The ridges 50 are truncated and the valleys 52 are of varying depth becoming of shallower depth in a direction toward the die ramp 53. The decrease in depth of the valleys 52 varies in accordance with the dimensions S1 and S2, previously described. Thus, S1 constitutes a step which is approximately 0.16P whereas S2 constitutes a step that is approximately 0.32P. Viewed from FIG. 5, the depth of the valleys 52 varies from approximately one-half of the depth of the valleys 48 (dimension d/2) to about three-fourths of the depth of the valleys 48 (dimension d/4). It is in these second series of ridges and valleys 50, 52 that the step taper of about two to three pitch length is formed on the screw and which corresponds to the screw thread section 16 of FIG. 1.

The die 41 also has a third series of ridges 54 with intervening valleys 56 that roll thread the screw section 14. The valleys 56 are of varying depth, as shown. A first imaginary plane is formed by the bases of the first valleys 48, such plane being one represented by the line 58. A second imaginary plane is formed by the bases of the valleys 52 and is represented by the line 60. Line 61 is parallel to line 58; hence the plane formed by the bases of the valleys 48 and the plane formed by the bases of the valleys 52 define the angle E, which is the entrance angle of about 5° to 8° referred to previously.

The bases of the valleys 56 define an imaginary plane represented by the line 62. This plane intersects the plane represented by the line 61 to form an angle R which is the ramp angle of 20° to 30°. The ramp portion of the die will thus forge section 14 (FIG. 1) with the thread crest taper forming an angle of about 20° to 30° with the screw axis 22.

The foregoing embodiments of the invention have been described as applied to a conventional 60° thread profile. However, the principles of the invention are applicable to other thread profiles as well.

The invention is claimed as follows:

1. A thread-forming screw fastener comprising a shank that has a portion thereof constituting an entrance end at which the screw is inserted into a hole in a workpiece, said portion having a tip and helical thread, the crest of the thread tapering toward said tip, said thread having a contour defining means for swaging a thread in the workpiece hole, said thread taper having a first section with a first taper and a second section with a second taper, the first section being intermediate the tip and the second section, the taper on the second section being less than the taper on the first section, the second section being substantially where the thread-swaging action commences when said entrance end is inserted into the workpiece hole such that said first section serves to enter and locate initially the fastener in the workpiece hole but with said first taper thereof being of a magnitude that would result in excessive end pressure for thread starting if extended through said second section, the shank having a third section adjacent to the second section and said thread extending into the third section, said third section being where the screw is maintained in holding relation with the thread formed in the workpiece hole, there being a taper from the third section into the second section, the second section thereby forming a step taper of less than about three pitch in axial length between the third section and the first section and constituting a means to decrease the end pressure required to effect said thread starting.

2. A thread-forming screw according to claim 1 in which the length of the second section is about two or three times the thread pitch.

3. A thread-forming screw according to claim 1 in which the shank has a longitudinal axis, the taper on said second section and said longitudinal axis form an entrance angle, and the entrance angle is not more than about three times the helix angle of the thread at said second section.

4. A thread-forming screw according to claim 1 in which said second section has a crest-to-root thread depth that runs from about 0.75 to 0.50 of the crest-to-root thread depth in the adjacent part of said third section.

5. A thread-forming screw according to claim 1 in which the shank has a longitudinal axis, the taper on said second section and said longitudinal axis form an entrance angle for the second section, said entrance angle is about 5° to 8°, and the taper on said first section and said longitudinal axis forms an angle of about 20° to 30°.

6. A thread-forming screw according to claim 1 or claim 3 in which said tip is pointed and the number of thread turns in the first section is greater than the number of thread turns in the second section.

7. A thread-forming screw fastener comprising a shank that has a portion thereof constituting an entrance end at which the screw is inserted into a hole in a workpiece, said portion having a tip and helical thread which tapers toward said tip, said thread having a contour defining means for swaging a thread in the workpiece hole, said tapered thread having successive first, second and third adjacent sections beginning at said tip, said second section forming a step taper between said first and third sections and said third section forming a holding section at which the fastener is held with the thread formed in the workpiece, said second section being of a length that is about two to three times the thread pitch, said second section being substantially where the thread-swaging action commences when said first section is inserted into the workpiece hole and constituting a means to decrease the end pressure required to effect thread starting, said shank having a longitudinal axis, the taper at said second section and said longitudinal axis forming an entrance angle for said second section that is not more than about thee times the helix angle of the thread at said second section, and said first section having a taper that is greater than said entrance angle.

8. A thread-forming screw fastener comprising a first section providing an entrance end for insertion into a workpiece, a second section, and a third section forming a holding section at which the fastener is held with the thread formed in the workpiece, said second section being intermediate the first section and the third section, a helical thread extending over all of said sections, the thread in at least the second section having means for swaging a thread in a workpiece, there being a step-taper between said third and first sections that is formed by said second section and serving to decrease the end pressure required to effect thread starting, there being a thread depth decrease from the third section as compared to the second section by about 0.16 of the thread pitch, there being a thread depth decrease in the first section as compared to the third section by about 0.32 of the thread pitch, and in which the thread in said second section has about a two to three pitch axial length.

9. A thread-forming screw fastener according to claim 1 or claim 2 in which said tip is blunt.

10. A thread-forming fastener according to claim 1 or claim 2 in which the step taper and the longitudinal axis of the shank form an entrance angle of about 5° to 8°.

* * * * *